United States Patent Office 2,840,610
Patented June 24, 1958

2,840,610

PROCESS FOR PREPARING CORROSION INHIBITORS

Tillman R. Pullig, Beacon, N. Y., assignor to The Texas Company, New York, N. Y., a corporation of Delaware No Drawing. Application July 2, 1956
Serial No. 595,037

4 Claims. (Cl. 260—552)

This invention relates to an improved process for preparing symmetrical disubstituted thioureas by reaction of carbon disulfide with phenyl-substituted lower alkyl primary amines, e. g., benzylamine, dl, alpha-phenylethyl amines, beta-phenylethyl amine, alpha-methyl beta-phenylethyl amine (benzedrene), and the like. Certain of these thioureas have been proposed as corrosion inhibitors, and the sym-(alpha- and beta-phenylethyl)-thioureas appear to be particularly efficacious as inhibitors for condensate well corrosion.

Heretofore it has been proposed to prepare such thioureas by reacting the amine with carbon disulfide in a solvent medium such as benzene or alcohol using a small amount of some substance intended to eliminate hydrogen sulfide from the reaction product, e. g., pyridine or sodium hydroxide. The overall reaction can be illustrated by the following equation:

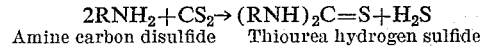

$$2RNH_2 + CS_2 \rightarrow (RNH)_2C=S + H_2S$$
Amine  carbon disulfide   Thiourea  hydrogen sulfide Where R is, for example, a phenyl-substituted $C_1$–$C_3$ alkyl radical.

I have now found that these symmetrical thioureas can be made rapidly in very high yield by forming a reaction mixture consisting essentially of substantially stoichiometric quantities of the amine and carbon disulfide, and maintaining said reaction mixture under autogenous pressure at a temperature in the range of about 115° to about 270° C. The reaction time for my improved process is generally between about 10 minutes and 2 hours, and, operating in the preferred temperature range of 120° to 150° C., a high quality product can be obtained in good yield in about 30 minutes. Other advantages of my improved process include elimination of solvent and/or catalyst recovery, preparation of larger quantities of product in a given size reactor since no reactor space need be used for solvents, excess reactants, etc., and easy adaptability of the process to continuous or semicontinuous operation. The reaction product can be purified, if desired, by conventional methods such as crystallizing from alcoholic solution.

Below about 115° C. the reaction is slowed and above about 270° C. the carbon disulfide reactant exerts such a high vapor pressure that the reactor must be made expensively heavy. Temperature between 120° and 150° C., especially one about 130° C., is preferred because the reaction pressure is then below 300 p. s. i. g., and the reaction is accomplished very promptly. Corrosion-resisting equipment such as austenitic stainless steel is preferred in the operation.

The following example shows one of the ways in which my invention has been practiced but is not to be construed as limiting the invention.

The reactor used was an agitated one-liter stainless steel autoclave. The reactor was purged with nitrogen. Two gram mols of beta-phenylethyl amine was charged into the reactor, and the reactor was sealed. One gram mol of carbon disulfide was then forced into the reactor with nitrogen pressure. The mixture was warmed up to temperature of 120°–130° C. and maintained in this range for 30 minutes. The reactor pressure attained during the heating period was 185 p. s. i. g. The pressure was then bled off and the exit gas ($H_2S$) passed through caustic scrubbers. The molten product was purged with nitrogen before removing it from the reactor to further rid it of $H_2S$. There was obtained 272 grams of sym-(beta-phenylethyl)-thiourea (a yield of 95.8% based on amine charged), said product having a melting point of 94°–95° C. and analyzing in weight percent 72.5% carbon, 7.9% hydrogen, 9.77% nitrogen, and 10.95% sulfur. The calculated analysis for $C_{17}H_{20}N_2S$ in weight percent is 71.8% carbon, 7.1% hydrogen, 9.8% nitrogen, and 11.3% sulfur.

Obviously, many modifications and variations of the invention, as hereinbefore set forth, may be made without departing from the spirit and scope thereof, and therefore only such limitations should be imposed as are indicated in the appended claims.

I claim:

1. In a process for preparing a symmetrical disubstituted thiourea by reaction of carbon disulfide with a phenyl-substituted lower alkyl primary amine, the lower alkyl group of said amine having from 1 to 3 carbon atoms, the improvement which comprises forming a reaction mixture consisting essentially of substantially stoichiometric quantities of the amine and carbon disulfide, said reaction mixture being formed without inert solvent, and maintaining said reaction mixture under autogenous pressure at a temperature in the range of about 115° to about 270° C. until a symmetrical disubstituted thiourea is formed.

2. The process of claim 1 wherein the reaction period is between about 10 minutes and 2 hours.

3. The process of claim 1 wherein the temperature used is between 120° and 150° C.

4. The process of claim 1 wherein the amine used is a phenylethyl amine, and the thiourea formed is a symmetrical phenylethyl thiourea.

References Cited in the file of this patent

Naunton: J. of the Society of Chemical Industry (London), vol. 45: pages 376T–7T (1926).